United States Patent Office

2,946,685
Patented July 26, 1960

2,946,685

COMPOSITION AND METHOD FOR TREATMENT OF CAGED PET BIRDS

Edward J. Ross, 4213 Prather Ave., St. Louis 9, Mo., and Charles H. Elbreder, 14 Lynbrook Drive, St. Louis 24, Mo.

No Drawing. Filed Dec. 2, 1957, Ser. No. 699,938

6 Claims. (Cl. 99—4)

This invention relates to composition and method for the treatment of caged pet birds and in particular is concerned with a supplement material which may be included in the diet of such caged pet birds to provide for weight gain and prevent and cure commonly occurring diseases.

The supplement of this invention in particular is concerned with a composition containing vitamin $B_{12}$, penicillin and streptomycin sulfate. This composition has been found to be quite invaluable in the treatment of caged pet birds to increase their general health and well-being and to provide weight gain. In addition, the composition has been found to be quite useful in preventing and curing such commonly occurring diseases as the common respiratory diseases, arthritis and bacterial enteritis. The method of application of the composition of this invention may be as an inexpensive inclusion of the material in conventional mineral blocks or in a dissolved state in the bird's drinking water which provides for a very simple inclusion in the bird's diet.

The caged pet birds to which this invention particularly applies are such caged pet birds as are commonly kept as pets. By the term "caged pet birds" we mean naturally wild small flying birds which are kept as pets as distinguished from domesticated fowl such as chickens, ducks, and geese. Such caged pet birds may be canaries, parakeets, cockatiels, finches, love-birds and the like which are commonly kept in small cages in homes as household pets. There has been a particular problem in the past in keeping such caged pet birds which have been found to be quite susceptible to changes in environment such as a shift from a pet shop to a home upon the sale of the bird or upon change from one room of the house to another, etc. Such birds, when kept in pet shops, have also been found to be very susceptible to bacterial infections or other sicknesses and diseases as mentioned above which has also been a further problem when these birds are either kept or transported in groups.

As a principal feature of this invention it has been found that the chemical composition containing vitamin $B_{12}$, penicillin and streptomycin sulfate can be added to the bird's drinking water or in the mineral block to provide for weight gain after the critical period when a bird is removed from one place to another and to prevent the formation of the commonly occurring diseases mentioned above. The symptomatic conditions signifying such diseases are puffed-up feathers, lack of pep, watery eyes, shortness of breath, sneezing, sulking, coughing, nasal discharge and other similar symptoms which have been found to be alleviated by treatment with the composition of this invention. Such symptoms are quite often manifested during moving of various types and other changes in environment such as temperature variations or changes even in the daily routine of the birds. By treatment with the composition of this invention, such general debility and signs of distress developed after a change in environment and removal from pet shops have been alleviated and obviated. As a consequence there has also been removed a source of dissatisfaction by purchasers of birds from pet shop owners.

Accordingly, it is a primary object of this invention to provide a composition and method for treatment of caged pet birds which increases their general well-being and prevents and cures commonly occurring diseases.

It is a further object of this invention to provide a composition and method for treatment of caged pet birds through the presentation of a chemical preparation containing vitamin $B_{12}$, penicillin and streptomycin sulfate which can be easily digested by caged pet birds.

It is still another object of this invention to provide a composition and method for treating caged pet birds to increase their general well-being and prevent and cure commonly occurring diseases such as the common bacterial respiratory diseases, arthritis and bacterial enteritis through the use of a chemical preparation which can be simply dissolved in the bird's drinking water or included in a mineral block.

Yet a further object of this invention is to provide a composition and method for treatment of caged pet birds through a composition containing vitamin $B_{12}$, penicillin and streptomycin sulfate which can be applied in a very simple manner by the average householder without any substantial expense or time consuming operations.

Further objects of this invention will appear in the detailed specification which follows and will be further apparent to those skilled in the art.

The chemical preparation of this invention includes vitamin $B_{12}$, Penicillin G. Potassium and streptomycin sulfate. Vitamin $B_{12}$, as is well known, is a cobalt containing substance which is classed as a coordination complex and may usually be produced by the growth of suitable microbial organisms or obtained from liver. The penicillin is in this invention used in the form of Penicillin G. Potassium and the streptomycin sulfate is used as streptomycin sulfate base.

It has been found in this invention that the range of proportions of these components may be in the order of 0.1 microgram of vitamin $B_{12}$, 2000 to 6000 units of Penicillin G. Potassium and 5 to 15 milligrams of streptomycin sulfate base per ounce of drinking water.

The above composition may be very simply employed as a tablet in the order of three grains (194 milligrams) by weight and may be bound by a suitable binder such as sucrose, sodium sulphate, magnesium silicate, etc. The preparation of such a tablet makes it very easy to apply the same in measured dosages in the drinking water of the bird. The preparation may also be included in the conventional mineral blocks which conventionally contain sodium chloride, calcium carbonate and calcium sulphate.

As an example of the composition of a tablet containing this chemical preparation, a formula is listed below in which a binder of sucrose to provide palatability is employed.

| Component | Amount | Percent by Weight |
|---|---|---|
| Streptomycin | 10 mg | 5.15 |
| Penicillin | 3,000 units (1.9 mg.) [1] | 0.98 |
| Vitamin B$_{12}$ | 0.1 mcg | 0.0000515 |
| Sucrose | 167 mg | 85.86 |
| Magnesium Silicate | 15.5 mg | 8.0 |

[1] 627 grams equivalent to 1 billion units.

Such tablets when made in the weight of three grains (194 milligrams) are added in amounts of about 1 tablet to each ounce of bird's daily drinking water. As an example for the application to parakeets, which ingest approximately one milliliter of water per day, such a dosage provides approximately .003 microgram of vitamin B$_{12}$, 100 units of penicillin and 330 micrograms of streptomycin sulfate. When included in a mineral block, the preparation is added in such amounts that the bird, based on its average daily consumption of the mineral block, will take in the same amount of the active ingredients, i.e., 0.003 microgram per day of vitamin B$_{12}$, 100 units of penicillin and 330 micrograms of streptomycin sulfate.

In the treatment of the birds to provide for general well-being and weight increase, it has been found that one such three grain tablet should be crushed and dissolved in each ounce of water in the bird's drinking cup per day as mentioned above and that this treatment should be continued for five days. In each new day of application the drinking cup should be refreshed and a new tablet added per each ounce of water. As a general health measure this five day treatment should be repeated every two or four weeks.

Where the birds show signs of ill health and sickness or where they are being transported as in the removal from a pet shop to a new home, a higher dosage should be given. Thus, if the birds show such symptoms as puffed-up feathers, lack of pep, watery eyes, shortness of breath, sneezing, sulking, coughing, nasal discharge, loose droppings and other indications of ill health, two tablets should be dissolved in each ounce of water in the bird's drinking cup. A fresh solution should be prepared for each day of application and the treatment should be carried out for five to six days or until the symptoms disappear and the bird is showing signs of good health. Should the bird be unable to imbibe the water with the dissolved tablets of this chemical preparation, the solution should be administered orally by a medicine dropper in about three to four applications per day.

The composition comprising vitamin B$_{12}$, penicillin and streptomycin sulfate have shown a very high degree of compatibility in promoting the general well-being of the bird and increase in health exemplified by weight gains of the bird and also in the prevention and actual curing of commonly occurring diseases. Such beneficial results and advantages occurring by the composition and treatment of this invention have been shown in a number of tests. There are presented below such test results to demonstrate the compatibility of these components in providing the over-all benefits of health, well-being, increase in weight and prevention and curing of the disease mentioned.

In carrying out the tests the efficacy of the composition and treatment of this invention was determined for sick birds which were suffering from bacterial respiratory diseases, bacterial enteritis and infectious arthritis. Birds suffering from a common disease were placed in the same cage. The control birds were placed in a separate cage and were given no treatment. In determining the existence of bacterial respiratory diseases such as pneumonia, bronchitis, rhinitis, such symptoms as nasal discharge, watery eyes, coughing, puffed-up feathers, and dyspnea were noted. To determine the presence of these diseases, the dead birds in the control group were autopsied and necrosis of the air sac was determined to be indicative of these respiratory diseases. Positive culture plates from the air sac smears were tested for bacterial origin by inhibition zones using penicillin crystals. In determining the presence of infectious arthritis, bony spurs on the birds' legs were scraped and agar cultures were made. The presence of organisms indicated positive identification. For the determination of bacterial enteritis, loose droppings of the birds were cultured on agar plates. Crystalline penicillin zones of inhibition were then noted on positive plates. Microscopic examinations showed positive bacterial organisms. The dead birds from the control group were autopsied and examined for inflammation and sectional smears on agar were made with the presence of organisms confirming the existence of bacterial enteritis.

To determine the improved benefits of the chemical composition and treatment of this invention, tests were run on canaries and parakeets of three to six weeks of age, the results of which are shown in Table I. The purpose of this study was to determine the general health and weight gain and food intake when the chemical composition and treatment of this invention was compared against a control in which the same diet was employed without the chemical composition being tested.

Table I

| Subject | Treatment | Results |
|---|---|---|
| Cage #1, 1 Canary | 1,500 Units Penicillin G. Potassium plus Vitamin B$_{12}$ 0.1 mcg. | 5 Days 17% gain. 15 Days 20% gain. 30 Days 23% gain. |
| Cage #2, 1 Canary | 1,500 Units Penicillin G. Potassium plus 15 mgm. Streptomycin Sulfate base plus Vitamin B$_{12}$ 0.1 mcg. | 5 Days 19% gain. 15 Days 20% gain. 30 Days 25% gain. |
| Cage #3, 1 Canary | Control—No antibiotic used. | 5 Days 9% gain. 15 Days 12% gain. 30 Days 15% gain. |

From these results it can be seen that the treatment employing 1500 units Penicillin G. Potassium, 15 mgm. streptomycin sulfate base and 0.1 mcg. of vitamin B$_{12}$ per ounce of drinking water provided the best results for general weight gain and well-being of the birds.

In the results of Tables II and III listed below and taken from actual experiments on disease infected birds, it can be seen that the general efficacy of the chemical composition treatment of this invention was quite marked. These test results were taken from birds suffering from bacterial respiratory diseases, bacterial enteritis and infectious arthritis. In the experiments from which the results of Test 1 are shown, nine cages were set up with diseased birds. The condition of the birds was noted and birds with bacterial enteritis were placed in the same cage while birds with infectious arthritis were placed in a separate cage. In the test results, commercial feed was used for both parakeets and canaries and regular tap water was employed for all birds. A standard 30 gram seed cup was employed and a standard drinking cup of 30 cc. was also utilized. Daily maintenance was observed with a change every day for the sand bed and the gravel bed as well as for the food and water. Perches were all cleaned and scraped and the cage location remained the same. Before each experiment bichloride of mercury was employed as a disinfectant and all dead birds were incinerated.

The experiments for which the results are shown in Table I were run on canaries and parakeets and employed either Penicillin G. Potassium and vitamin B$_{12}$ or streptomycin sulfate base and vitamin B$_{12}$ separately and were compared against a control in which no treatment was utilized.

Table II

| Subject | Treatment | Results |
|---|---|---|
| Cage #1, 3 Canaries | 2,000 Units Pencillin G. Potassium plus 0.1 mcg. Vitamin $B_{12}$ per ounce of drinking water. | 2 Dead; 1 Survived after 15 days of Therapy. |
| Cage #2, 3 Canaries | 5 mgm. Streptomycin Sulfate Base plus 0.1 mcg. Vitamin $B_{12}$ per ounce of drinking water. | 1 Dead; 2 Survived. |
| Cage #3, 4 Canaries | Control | 3 Dead; 1 Survived. |
| Cage #4, 3 Parakeets | 4,000 Units Pencillin G. Potassium plus 0.1 mcg. Vitamin $B_{12}$ per ounce of drinking water. | 2 Dead; 1 Survived. |
| Cage #5, 3 Parakeets | 7.5 mgm. Streptomycin Sulfate Base plus 0.1 mcg. Vitamin $B_{12}$ per ounce of drinking water. | 1 Dead; 2 Survived. |
| Cage #6, 3 Parakeets | Control | 3 Dead; 0 Survived. |
| Cage #7, 2 Parakeets | 6,000 Units Pencillin G. Potassium plus 0.1 mcg. Vitamin $B_{12}$ per ounce of drinking water. | 1 Dead; 2 Survived. |
| Cage #8, 3 Parakeets | 15.0 mgm. Streptomycin Sulfate Base plus 0.1 mcg. Vitamin $B_{12}$ per ounce of drinking water. | 1 Dead; 2 Survived. |
| Cage #9, 3 Parakeets | Control | 3 Dead; 0 Survived. |

From the results above listed, it can be seen that penicillin therapy resulted in restoring about 43% of the ailing birds to health. In the employment of streptomycin sulfate, about 66% of the ailing birds were restored to health. In the employment of the control with no treatment whatsoever, 100% of the birds died.

A further series of tests were run, the results of which are shown in Table III, to show the improved results in the treatment of sick birds by using a combination of streptomycin sulfate, Penicillin G. Potassium and vitamin $B_{12}$. The results are shown below.

Table III

| Subject | Treatment | Results |
|---|---|---|
| Cage #1, 3 Canaries | 3,000 Units Penicillin G. Potassium plus 0.1 mcg. Vitamin $B_{12}$ per ounce of drinking water. | 2 Dead; 1 Survived. |
| Cage #2, 3 Canaries | 10 mgm. Streptomycin Sulfate Base plus 0.1 mcg. Vitamin $B_{12}$ per ounce of drinking water. | 1 Dead; 2 Survived. |
| Cage #3, 3 Canaries | Control | 3 Dead. |
| Cage #4, 3 Parakeets | 3,000 Units Penicillin G. Potassium plus 0.1 mcg. Vitamin $B_{12}$ per ounce of drinking water. | 1 Dead; 2 Survived. |
| Cage #5, 3 Parakeets | 10 mgm. Streptomycin Sulfate Base plus 0.1 mcg. Vitamin $B_{12}$ per ounce of drinking water. | 0 Dead; 3 Survived. |
| Cage #6, 3 Parakeets | Control | 2 Dead; 1 Survived. |
| Cage #7, 3 Canaries | 3,000 Units Penicillin G. Potassium plus 10 mgm. Streptomycin Sulfate Base plus 0.1 mcg. Vitamin $B_{12}$ per ounce of drinking water. | 0 Dead; 3 Survived. |
| Cage #8, 3 Parakeets | 3,000 Units Penicillin G. Potassium plus 10 mgm. Streptomycin Sulfate Base plus 0.1 mcg. Vitamin $B_{12}$ per ounce of drinking water. | 0 Dead; 3 Survived. |
| Cage #9, 3 Parakeets | Control | 2 Dead; 1 Survived. |

From the results shown above it can be seen when 3000 units of Penicillin G. Potassium were employed with 0.1 mcg. of vitamin $B_{12}$ per ounce of drinking water that out of a total of 6 birds treated 3 were lost and this resulted in a 50% curing of the birds. From the results of cages 2 and 5 where 10 mgm. of streptomycin sulfate base were employed, it can be seen that out of a total of 6 birds treated only 1 bird was lost and 84% were saved. From the results shown for cages 7 and 8 where a total of 6 birds were treated employing the chemical preparation of this invention using 3000 units Penicillin G. Potassium plus 10 mgm. streptomycin sulfate base plus 0.1 mcg. of vitamin $B_{12}$, no birds were lost and all 6 birds were saved for a 100% rating. In cages 3, 6 and 9 where a control was employed signifying no treatment whatsoever, out of the 9 birds tested, 8 were lost and thus only 12% were saved.

It is evident from these results that the chemical preparation of this invention utilizing Penicillin G. Potassium, streptomycin sulfate base and vitamin $B_{12}$ is quite effective in the treatment of caged pet birds. This treatment promotes their general health and well-being resulting in increased weight and also is very effective in the curing of the common bird diseases. The conjoint use of these three components, the Penicillin G. Potassium, the streptomycin sulfate base and the vitamin $B_{12}$, is very effective and none of these agents has the disadvantage of incompatibility. This is quite important particularly in the use of vitamin $B_{12}$, since any adverse effect upon the antibiotic activity of the penicillin and the streptomycin sulfate would defeat the purpose of this invention. In the employment of the chemical composition comprising penicillin, streptomycin and vitamin $B_{12}$, synergistic result is obtained making possible the employment of the chemical preparation as a weight and health promoting agent as well as a disease inhibiting and curing agent. The low cost and simple employment of the chemical preparation makes it particularly useful by the average householder and it is such an advantage in addition to the general efficacy as described above that makes this chemical composition and treatment so advantageous.

Various modifications and changes in this invention may be made within the teaching herein disclosed and as will be apparent to those skilled in the art. Such changes and modifications are within the spirit of this invention as defined by the claims appended hereto.

What is claimed is:

1. A process for treating caged pet birds to improve their health and well-being and to combat commonly occurring caged bird diseases such as the respiratory diseases, bacterial enteritis and infectious arthritis comprising administering to the bird a chemical composition including penicillin, streptomycin and vitamin $B_{12}$ in about the relative proportions of 2,000 to 6,000 units of penicillin, 5 to 15 milligrams of streptomycin and 0.1 microgram of vitamin $B_{12}$.

2. A process for treating caged pet birds to improve their health and well-being and to combat commonly occurring caged bird diseases comprising administering to the bird a chemical composition dissolved in the bird's drinking water, said chemical composition being present for each ounce of water in about the relative proportions of 2,000 to 6,000 units of penicillin, 5 to 15 milligrams of streptomycin and 0.1 microgram of vitamin $B_{12}$.

3. A process for treating caged pet birds to improve their health and well-being and to combat commonly occurring caged bird diseases comprising administering to the bird a chemical composition dissolved in the bird's drinking water, said chemical composition being present for each ounce of water in about the relative proportions of 2,000 to 6,000 units of penicillin, 5 to 15 milligrams of streptomycin and 0.1 microgram of vitamin $B_{12}$, said drinking water being replenished with the dissolved chemical composition daily for a period of at least several days.

4. A process for treating caged pet birds to improve their health and well-being and to combat commonly occurring caged bird diseases comprising administering to the bird a chemical composition incorporated into a mineral block, said chemical composition being in about the relative proportions of 2,000 to 6,000 units of penicillin, 5 to 15 milligrams of streptomycin and 0.1 microgram of vitamin $B_{12}$.

5. A caged pet bird composition of matter in the form of a tablet, said tablet weighing about 194 milligrams and consisting essentially of vitamin $B_{12}$, penicillin, streptomycin and a palatable water-soluble binder, said components being present in the proportion of 2,000 to 6,000 units of penicillin, 5 to 15 milligrams of streptomycin, 0.1 microgram of vitamin $B_{12}$ and a major proportion of said binder.

6. A caged pet bird mineral block, said block consisting essentially of vitamin $B_{12}$, penicillin, streptomycin, sodium chloride, calcium carbonate, and calcium sulphate, said vitamin $B_{12}$, penicillin and streptomycin being present in the relative proportions of 2,000 to 6,000 units of penicillin, 5 to 15 milligrams of streptomycin and 0.1 microgram of vitamin $B_{12}$.

References Cited in the file of this patent

UNITED STATES PATENTS

| | | |
|---|---|---|
| 2,753,266 | Ott | July 3, 1956 |
| 2,768,081 | Buckwalter | Oct. 23, 1956 |

OTHER REFERENCES

Groschke: Poultry Science, XXIX, July 1950, pp. 616–618.

Richardson et al.: Jr. Nutrition 44 (1951), pp. 371–381.